United States Patent [19]

Carle

[11] 4,222,412

[45] Sep. 16, 1980

[54] HIGH PRESSURE VALVE FOR CHROMATOGRAPHY

[75] Inventor: Don W. Carle, La Habra, Calif.

[73] Assignee: Carle Instruments, Inc., Anaheim, Calif.

[21] Appl. No.: 3,113

[22] Filed: Jan. 15, 1979

[51] Int. Cl.³ .............................................. F16K 5/06
[52] U.S. Cl. ............................ 137/625.47; 137/375; 251/317
[58] Field of Search ............... 251/317, 315; 137/375, 137/625.47

[56] References Cited

U.S. PATENT DOCUMENTS

| | | | |
|---|---|---|---|
| 3,124,334 | 3/1964 | Szohatzky | 251/317 X |
| 3,244,398 | 4/1966 | Scaramucci | 251/317 X |
| 3,297,053 | 1/1967 | McKinney | 137/625.46 |
| 3,974,869 | 8/1976 | Abe | 137/375 X |
| 4,026,516 | 5/1977 | Matousek | 251/317 X |

FOREIGN PATENT DOCUMENTS 1061012  11/1953  France .................................... 251/317

Primary Examiner—Arnold Rosenthal
Attorney, Agent, or Firm—Leydig, Volt, Osann, Mayer & Holt, Ltd.

[57] ABSTRACT

A valve in which a cold flowable, non-absorbing sealing member, such as tetrafluoroethylene resin, is confined within complementary surfaces of an outer hollow body and an inner, rotatable element, and substantial pressure is imposed on the member to compress and cold flow its material into sealing engagement with the complementary surfaces. At least one passage is formed in the inner element, and ports are formed in the surrounding member and body so as to come into selective alinement with the passage.

2 Claims, 6 Drawing Figures

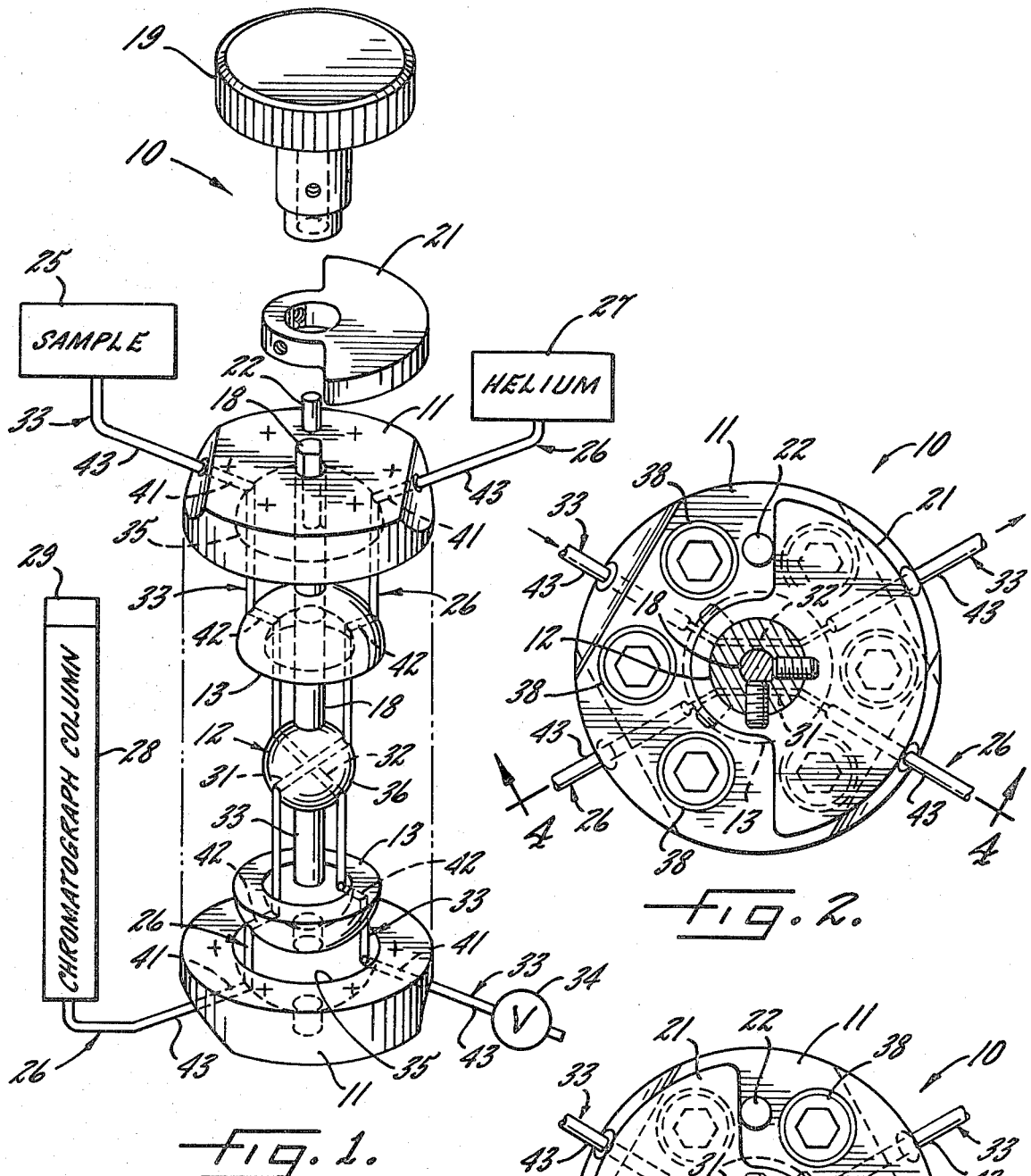
fig. 1.
fig. 2.
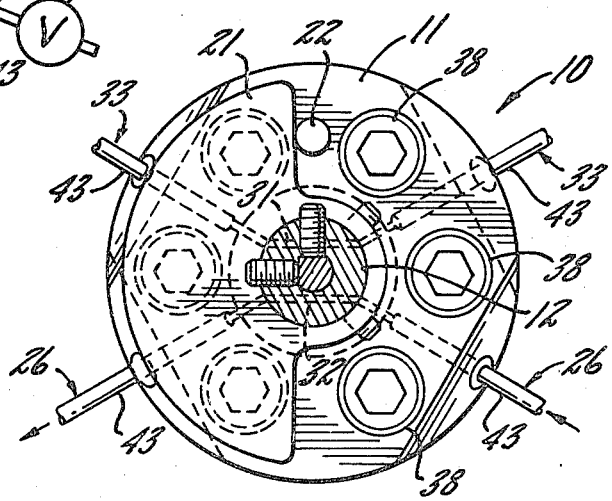
fig. 3.

HIGH PRESSURE VALVE FOR CHROMATOGRAPHY

The present invention relates generally to precision valves and more particularly concerns a chromatography valve suitable for either a sampling or selector function.

A gas chromatograph depends, for its accuracy, upon introduction of a precise volume of sample to the chromatograph column so that the eventual detector signal is a measure of the unknown concentration in the sample. An effective valve for these applications should be virtually leakproof and, further, should have little or no dead volume that is unswept by the flow of sample or carrier gas.

One approach to the design of such valves is to provide two bodies having relatively movable surfaces held in tight engagement, with one body having valve ports leading to the surface and the other body having passages that can selectively couple the ports. Typically, one of said surfaces would be formed of cold flowable material held at considerable pressure against the opposing surface so as to minimize leakage. Examples of such valves are shown in U.S. Pat. No. 3,297,053, issued Jan. 10, 1967.

It is the object of this invention to provide an improved gas chromatography valve capable of handling high pressures with virtually no leakage. More specifically, valves of this character are expected to handle materials at pressures of several thousand psi as contrasted with prior valves usually rated at no more than one or two hundred psi.

Another object of the invention is to provide a valve of the above kind that has little dead volume that is not swept by the materials being handled.

A further object is to provide a valve as characterized above that is suitable for being scaled to measure and control the introduction of samples ranging widely in volume from a small fraction of one microliter to several milliliters.

Yet another object is to provide a valve whose design is well suited for use of corrosion resistant materials for the valve parts without altering the other characteristics of the valve.

Other objects and advantages of the invention will become apparent upon reading the following detailed description and upon reference to the drawings, in which:

FIG. 1 is a partially diagrammatic, exploded perspective of a valve embodying the present invention;

FIG. 2 is a top end elevation, beneath the manual control knob, of the valve shown in FIG. 1;

FIG. 3 is similar to FIG. 2 showing the valve parts in an alternate operating position;

Figure 4:
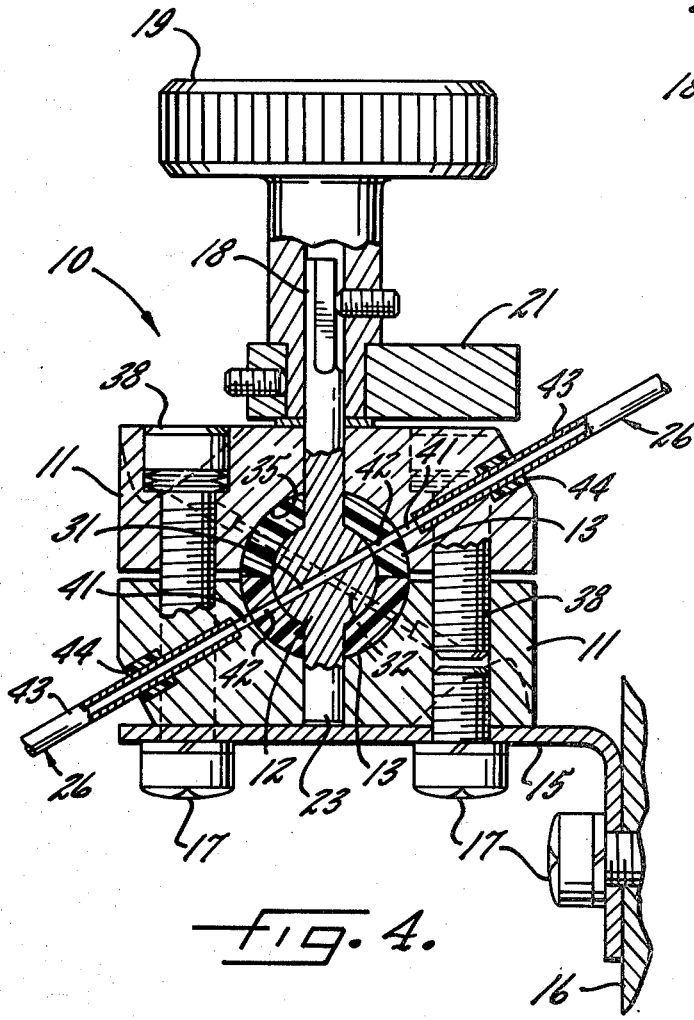
FIG. 4 is a longitudinal section taken approximately along the line 4—4 in FIG. 2.
Figure 5:
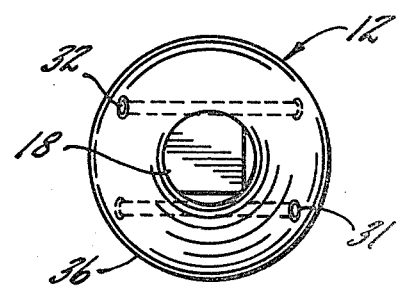
FIG. 5 is an end elevation of the valve element used in the valve of FIG. 1.
Figure 6:
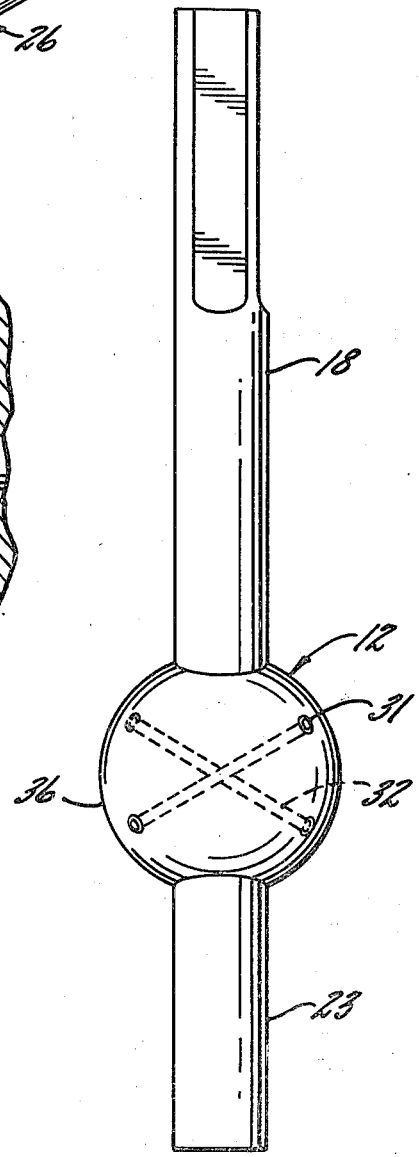
FIG. 6 is a side elevation of the element shown in FIG. 5.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Turning to the drawings, there is shown a valve 10 embodying the invention including a rigid outer body 11, a rigid inner valve element 12, and an intermediate sealing member 13. In the illustrated form, the body 11 is secured to a bracket 15, which in turn is secured to an instrument frame 16, by screws 17, and the valve element 12 has an extending shaft 18 supporting a position control knob 19 and a cam 21 that interacts with a pin 22 on the body 11 to establish alternate operating positions of the element 12. Another stub shaft 23 cooperates with the shaft 18 to establish the position and relative movability of the element 12 with respect to the body 11.

The illustrative valve 10 is shown as a sample valve selectively adding a precise volume of a sample from a source 25 to a pure gas stream in a line 26 from a source 27 of helium, for example, to the chromatograph column 28 and its detector 29. The sample volume is determined by the volume of passages 31 and 32 in the element 12. In one position of the valve, the passage 32 is alined with a line 33 running from the sample source 25, which can be a liquid under very high pressure, to a valve 34, and the other passage 31 is alined with the pure gas stream line 26. To introduce the measured sample, the valve 34 is briefly opened to insure that the passage 32 is filled with sample. The knob 19 is then turned 180° to switch the alinement of the passages 31, 32, and the sample in the passage 32, assuming it is a liquid under high pressure, flash evaporates in the pure gas stream and goes to the column 28.

In accordance with the invention, the sealing member 13 is substantially confined within an inner hollow surface 35 of the body 11 and an element outer surface 36 that is complementary and spaced from the hollow surface 35, the member 13 is formed of cold flowable, non-absorbing material, and substantial pressure is applied to compress and cold flow the member between the surfaces 35, 36. Preferably, the rigid body 11 is formed in two halves and the inner surface 35 is spherical, the rigid valve element surface 36 is also spherical, and the sealing member 13 is shaped as two cup-like halves of a hollow ball.

The material of the member 13 is preferably tetrafluoroethylene resin, either filled or not, which the art recognizes as non-absorbing in such applications. The initial shape of the cup-like halves of the member 13 should have an outer surface slightly larger in diameter than the inner surface 35, and an inner surface slightly smaller than the spherical surface 36. Compressive pressure is applied by drawing the body 11 halves together by tightening a plurality of screws 38 so as to develop, typically, pressures on the order of 25,000–30,000 psi to the member 13 and thus produce an almost fluid-like seal.

The lines 26, 33 through the valve 10 include ports 41 and 42 formed respectively in the body 11 and the sealing member 13, and tubing 43. The tubing 43 is closely fitted in recesses formed in the body 11 and leakage is prevented by seals 44 interposed between the body and the tubing.

As a feature of the invention, the passages 31, 32 in the element 12 are slightly smaller in cross section than are the ports 42 in the sealing member 13, and the ports 32 are slightly smaller in cross section than the ports 41 in the body 11. In this way, there is some slight cold flowing of the sealing member material into the body ports 41, thereby insuring a good seal at the port-to-port interface, whereas the smaller passages 31, 32 prevent similar cold flowing of the sealing material into those passages which could result in scratching of the relatively movable surface 36 and the sealing member 13.

By forming the surfaces 35, 36 in spherical form and similarly forming the halves of the member 13, good, balanced, almost uniform force is exerted between the valve parts insuring a good seal between the relatively fixed surface 35 and the sealing member 13 and between the rotatable surface 36 and the sealing member 13. Those skilled in the art will understand that the valve parts can be alternately ported so that the valve can serve as a selector as well as a sample valve.

Because of the very high pressures which can be developed against the relatively movable valving surfaces, a valve of this type can be rated to control liquids and gases at pressures of several thousand psi. It will also be appreciated that there is little or no dead volume within the valve that is not swept by the materials being handled.

It can be seen that the valve 10 is well suited to being scaled, particularly with respect to the size of the passages 31, 32, to handle a wide variety of sample sizes since very small holes drilled in a small valve element 12 could produce a sample volume being but a small fraction of one microliter, whereas a larger element having larger passages could measure and discharge samples on the order of several milliliters. In the event corrosive materials are to be handled, the relatively simple shapes of the body 11 and the element 12 permit them to be readily formed of glass or special non-corrosive metals.

I claim as my invention:

1. A valve comprising, in combination, a rigid outer body having an inner hollow surface, an inner rigid element mounted for movement relative to said body and having an outer surface that is complementary to and spaced from said hollow surface, a sealing member formed of cold flowable, non-absorbing material substantially confined within the space between said hollow surface and said outer surface, means for applying substantial pressure to compress and cold flow said member between said surfaces, said element having at least one passage therethrough, said outer body and said member having valve ports that are alined with said passage in at least one position of said relative movement between the element and the body, and said inner hollow surface being sperical and said body being formed in two halves, said element outer surface also being spherical and said element being rotatable in said body, said sealing element being shaped as two cup-like halves of a hollow ball, and said means applying said pressure acts by drawing together said body halves containing the element and the member.

2. A valve comprising, in combination, a rigid outer body having an inner hollow surface, an inner rigid element mounted for movement relative to said body and having an outer surface that is complementary to and spaced from said hollow surface, a sealing member formed of cold flowable, non-absorbing material substantially confined within the space between said hollow surface and said outer surface, means for applying substantial pressure to compress and cold flow said member between said surfaces, said element having at least one passage therethrough, said outer body and said member having valve ports that are alined with said passage in at least one position of said relative movement between the element and the body, and said passage through said element being of slightly smaller cross section than said ports through said member that aline with the passage so that there is no cold flow of said material into the ends of the passage, and the ports in said outer body being slightly larger than the alined ports in the sealing member so that there is some cold flow of the material into the ports of the body and thus good sealing at the port-to-port interface.

* * * * *